(12) United States Patent
Jahkonen

(10) Patent No.: US 7,331,426 B2
(45) Date of Patent: Feb. 19, 2008

(54) ELEVATOR SYSTEM USING A SUPERCAPACITOR AS A BACKUP POWER SOURCE

(75) Inventor: Pekka Jahkonen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/645,052

(22) Filed: Dec. 26, 2006

(65) Prior Publication Data

US 2007/0163844 A1    Jul. 19, 2007

Related U.S. Application Data

(63) Continuation of application No. PCT/FI2005/000325, filed on Jul. 11, 2005.

(30) Foreign Application Priority Data

Dec. 7, 2004   (FI) .................................. 20040973

(51) Int. Cl.
*B66B 1/06* (2006.01)
(52) U.S. Cl. ....................... 187/290; 318/106
(58) Field of Classification Search ................ 187/290, 187/296, 297, 293; 307/66, 69; 318/375, 318/376, 377, 106, 108, 109, 382, 161
See application file for complete search history.

(56) References Cited

U.S. PATENT DOCUMENTS 5,260,637 A * 11/1993 Pizzi .......................... 320/103
6,460,658 B2 * 10/2002 Suga et al. .................. 187/290
6,742,630 B2 *  6/2004 Eilinger ...................... 187/290
6,938,733 B2 *  9/2005 Eilinger ...................... 187/290

OTHER PUBLICATIONS

Alfred Rufer, IEEE Transactions on Industry Applications, vol. 38, No. 5, Sep./Oct. 2002, pp. 1151-1159.
Dr. P. Barrade et al., Power Conversion Conference, 2002, Proceedings of the Osaka, Japan Apr. 2-5, 2002, pp. 1160-1165.

* cited by examiner

*Primary Examiner*—Jonathan Salata
(74) *Attorney, Agent, or Firm*—Birch, Stewart, Kolasch & Birch, LLP

(57) ABSTRACT

An elevator system uses a supercapacitor to store electric energy. Furthermore, the supercapacitor can be used as a source of reserve power in emergency situations, such as power failures. The supercapacitor is connected together with three switching branches to a rectified signal of the power supply of the motor. By closing and opening the switches, the supercapacitor can be charged when the motor load is small. When the motor load is large or when the power supply fails, the electric energy contained in the supercapacitor can be discharged for use by the motor. In an emergency, the motor drives the elevator at a speed lower than normal, and therefore a supply voltage lower than normal is sufficient. Also, energy obtained from braking of the elevator can be stored in the supercapacitor, which has a storage capacity of considerable magnitude as compared to an ordinary capacitor. By applying the invention, the energy consumption of the elevator can be reduced because the waste energy obtained from the power supply can be stored and utilized when more energy is needed.

36 Claims, 1 Drawing Sheet

ELEVATOR SYSTEM USING A SUPERCAPACITOR AS A BACKUP POWER SOURCE

Figure 1:
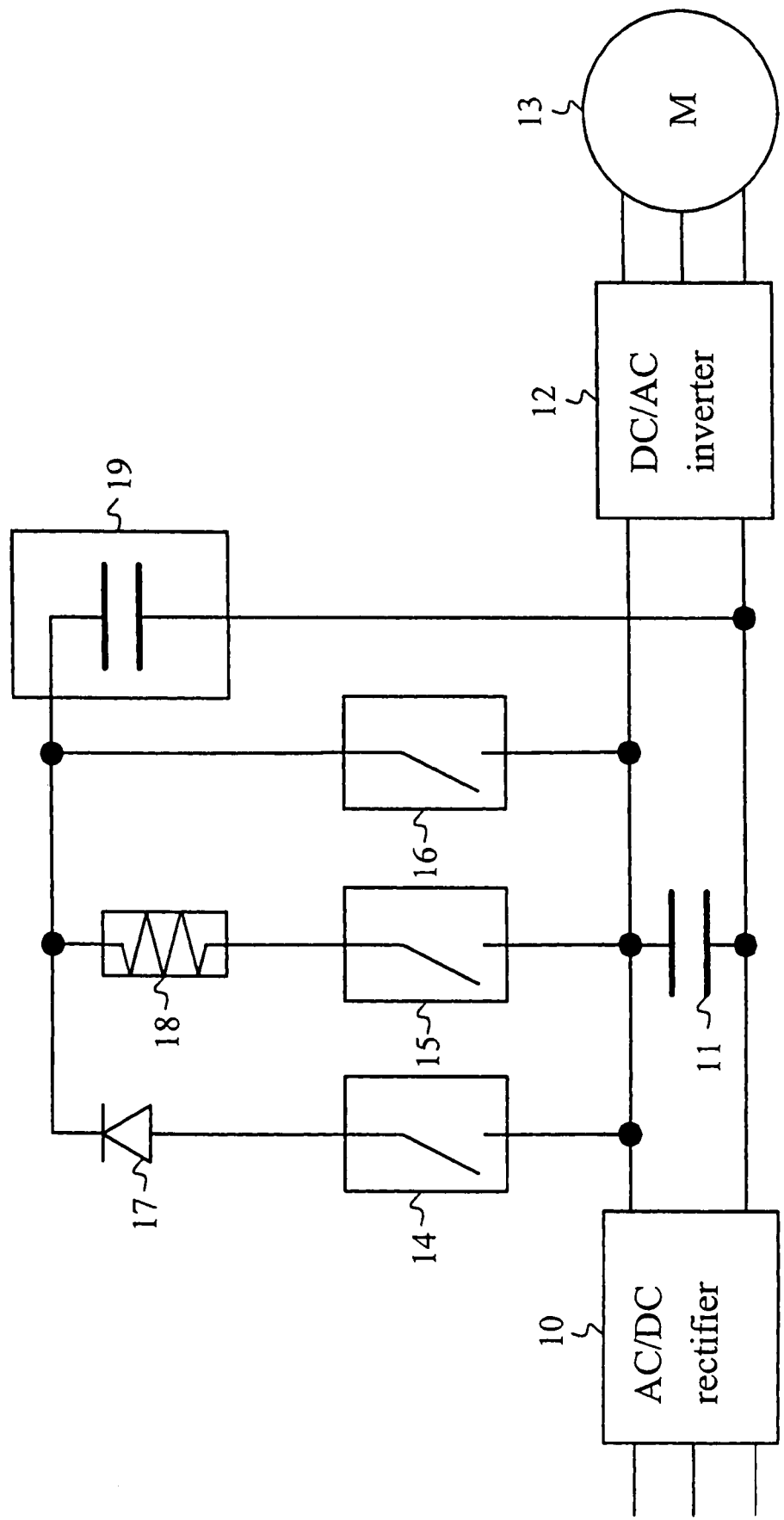

This application is a Continuation of copending PCT International Application No. PCT/FI2005/000325 filed on Jul. 11, 2005, which designated the United States, and on which priority is claimed under 35 U.S.C. § 120. This application also claims priority under 35 U.S.C. § 119(a) on Patent Application No(s). 20040973 filed in Finland on Jul. 12, 2004. The entire contents of each of the above documents is hereby incorporated by reference.

FIELD OF THE INVENTION

The present invention relates to the supply of electric power needed in an elevator system.

BACKGROUND OF THE INVENTION

For the operation of an elevator system, a reliable electric power supply system is required. Normally, the supply of electric power is obtained from traditional mains current and the electric energy obtained can be transformed to a desired voltage level by means of transformers. For faultless operation of the elevator system, uninterrupted supply of electric power is required, because the nature of the elevator system is such that a power failure may result in an elevator with passengers on board stopping between floors and thus in a danger situation. Therefore, elevator systems are provided with standby power sources for the supply of electric energy in cases of emergency.

Prior-art emergency power sources so far used in elevators are batteries and/or safety circuits. The batteries used have typically been lead acid batteries, which have a maximum service life of the order of five years. An example of a prior-art standby power source is presented in specification U.S. Pat. No. 4,316,097, which includes a battery and an associated circuit.

So-called supercapacitors are able to store a considerably larger electric charge than ordinary capacitors. Supercapacitors may have a capacitance in the range of e.g. 100 . . . 2000 F. Therefore they offer an interesting possibility for the storage and supply of electric energy. It is expected that supercapacitors will replace lead acid batteries in many present-day applications in the near future. At present, the biggest obstacle to this is the expensive price of supercapacitors.

A plurality of supercapacitors can be connected together to form a so-called supercapacitor pack, which has a greater electric charge storing capacity and provides a higher voltage than an individual supercapacitor. Supercapacitors are capacitors containing a double-layer structure, wherein the electrodes consist of active carbon. Consequently, the capacitor contains several thousands of square meters of so-called effective area per gram of carbon, and it contains two electrodes separated from each other by a very small distance, which is of the order of nanometers. Due to these properties, supercapacitors have a very large capacitance, which may be hundreds or even thousands of farads.

In the maintenance of elevators, material costs constitute a fairly small proportion in relation to other costs, because most of the maintenance costs consist of the salaries and travel costs of maintenance personnel. For this reason, supercapacitors provide an important alternative as a standby power source not-withstanding their high price.

A supercapacitor works like an ordinary capacitor, which is capable of storing electric charge. For this reason, they can not be connected directly in place of batteries to replace these. The voltage of a capacitor depends linearly on its electric charge, whereas the voltage of a lead acid battery is non-linear in relation to the charge. At high charge values, the battery voltage remains nearly constant, and as the charge diminishes, the voltage falls rapidly from the constant value to zero. From the foregoing it follows that most power source solutions containing supercapacitors comprise a circuit for stabilizing the supercapacitor's output voltage as an AC or DC supply voltage of a desired level.

According to a prior-art example, the voltage obtained from the terminals of a supercapacitor having an energy capacity of 10 Wh varies within the range of 20 V . . . 60 V. When the terminals are connected to a separate stabilizer (power requirement about 4 kW), the stabilizer will give either a 48-V direct voltage or a 230-V alternating voltage at its output.

As the voltage (so-called cell voltage) of one plate capacitor is low (typically of the order of 2.5 V), it is necessary to connect numerous capacitors in series to produce one supercapacitor. Besides the above-mentioned reasons, stabilizers are also needed because of the high price of the supercapacitor. Considered from a technical perspective, it is possible to connect even hundreds of capacitors in series. Large capacitor series like this are used e.g. in trains.

The price of a supercapacitor today is of the order of about 40 to 80 euros per watt-hour, depending on the voltage obtainable, and the energy obtained per unit mass is about 3.5 Wh/kg. The packing technology leads to high costs of high-voltage capacitor units.

Specification U.S. Pat. No. 6,742,630 describes the use of supercapacitors as an energy source, or rather as an energy storage, in an elevator system. During acceleration and braking of the elevator, a great deal of power is needed, and this is obtained partly from a power source consisting of a supercapacitor to the motor. Another objective is to balance the energy consumption via charging and discharging of a supercapacitor so that when the elevator (or elevators) is/are stationary, the supercapacitor is charged taking the energy from the main power source (mains power) and the additional energy required during accelerating movement of the elevator is taken from the charged supercapacitor instead of the mains. Furthermore, the supercapacitor can be used to store energy obtained during braking.

A reserve power solution commonly used in elevators is lead acid batteries, which involve the problem of a relatively short service life, typically about five years. In addition, they have a large size and give a fairly low voltage level, which is why it is necessary to connect a large number of them together, with the result that the battery system takes up an undesirably large space. The battery system has to be provided with power transformers to supply a three-phase alternating current to the elevator motors, and consequently the system is very complicated. For the elevator system to work reliably, an apparatus that is simple in operation and contains a small number of components is required.

Electric converters are basically reliable. However, elevator applications require a wide power range (5 . . . 100 kW), which is why it would be necessary to have several converters to produce different output powers. This further leads to quality problems due to the complicated nature of the apparatus, as well as high equipment costs.

OBJECT OF THE INVENTION

The object of the present invention is to disclose a reliable and economical electricity supply system for emergency situations in an elevator system. A further object of the invention is to save energy consumed by elevator motors in the normal operating condition of elevators.

BRIEF DESCRIPTION OF THE INVENTION

As for the features of the invention, reference is made to the claims.

The present invention discloses a method and a device for storing electric energy needed in an elevator system. Moreover, the present invention functions as a standby power source in emergencies occurring in the elevator system, e.g. when the supply of electric power is interrupted.

In the method, a supercapacitor or a supercapacitor pack consisting of a plurality of supercapacitors is used as a storage of electric energy. The supercapacitor is placed in the power supply system of the motor. The supply signal is rectified, whereupon the signal is connected to a circuit according to the present invention, and further the signal is connected via an inverter to the motor controlling the elevator. Connected between the terminals of the rectified signal is a DC capacitor regulating the voltage fed into the motor.

The idea of the method is to charge the supercapacitor with electric energy when the elevator is braking or stationary or when the elevator has a small load. In other words, the supercapacitor is charged when the power supply produces so much energy that some of it is not needed for driving the elevator. The charging is controlled by means of a charging switch.

After the supercapacitor has been charged to its maximum voltage (or more generally, a value exceeding the voltage of the DC capacitor is sufficient), the stored energy can be discharged to the motor e.g. when the supply of power is completely interrupted by an external failure or when the elevator has such a big load that an extra high torque and therefore an extra large motor supply current are required. The discharging of the supercapacitor is controlled by means of a discharging switch.

When at starting time of the system the supercapacitor has zero charge, it can be pre-charged by activating a switching branch containing a pre-charging switch (which branch in a preferred embodiment contains a resistor in series with the switch).

When the pre-charged supercapacitor is to be charged so that its voltage rises beyond the voltage of the DC capacitor, the charging switch is closed and the other switches are kept open. In a preferred embodiment, a diode is connected in series with the charging switch.

When energy stored in the supercapacitor is to be passed to the motor, the discharging switch is closed (while the other switches are kept open). In this situation, energy flows via the inverter to the motor and at the same time the charge in the supercapacitor diminishes, thereby reducing the voltage of the supercapacitor. When the voltage falls to the voltage value of the DC capacitor, the limit is reached at which the supercapacitor has to be charged during normal operation. During emergency operation with no power supply, the voltage may fall even below this, in which case a voltage lower than usual is fed to the motor. As a consequence, the elevator travels at a speed lower than normal, but in emergency operation this is justifiable. In emergency operation it typically suffices to have the car driven to the nearest floor if the elevator has stopped between floors e.g. due to a power failure.

The DC capacitor, too, can be charged when the voltage of the supercapacitor exceeds the charge of the DC capacitor. In this case, the branch containing the charging capacitor is closed.

The advantages of supercapacitors include a practically unlimited service life. In addition, supercapacitors can be charged and discharged with a high power and also repeatedly more times than batteries. Moreover, as per unit mass, supercapacitors are more efficient energy storing devices, because the power density of supercapacitors is about 10-15 kW/kg, whereas that of batteries is about 0.3-1 kW/kg. Even if the charging or discharging current is large, supercapacitors can be charged or discharged completely. The maintenance need of supercapacitors is small or practically even insignificant. Thanks to their long service life, and because elevator systems are long-lived as well, supercapacitors are a very environmentally friendly solution.

Essential advantages of the present invention are simplicity and reliability of the apparatus and economical costs as compared to converters (in an example, the costs are reduced to one sixth). In the present invention, as energy that would otherwise be lost can be stored in a supercapacitor, a direct reduction of the costs of power supply is achieved. The required fuses can be smaller than before, and in the event of a power failure the elevator car can be driven safely to the nearest floor. The supercapacitor used as an energy storage and the associated components are easily scalable, because the capacity of the switches can be changed. An apparatus according to the present invention can be connected to old elevators as well, because no changes need to be made in the power supply itself.

In respect of electromagnetic compatibility (EMC), the disturbances emitted by the device into its environment are very slight and in addition the power losses are very low. The controller of the device is very simple and the only input data it requires are the measurement results regarding the two direct voltages.

At present, the price of supercapacitors is very high. Within a few years, their price is supposed to fall so much that the solution of the present invention will challenge the existing emergency apparatus in elevator systems. As the present invention enables a significant energy saving, in the future it will become an effective challenger, in respect of costs, of e.g. existing dual power supply systems or cables.

LIST OF FIGURES

FIG. 1 presents a circuit diagram according to the invention for an elevator system's standby power source that can be used to store electric energy.

DETAILED DESCRIPTION OF THE INVENTION

In the present invention, a supercapacitor pack providing a high voltage is connected as a power source in an elevator system by using simple switching components. As the price of supercapacitors is continuously falling and they can produce high output voltages, they are well applicable for use as an energy storage in an elevator system. The supercapacitors are preferably connected to the elevator system by an electromechanical solution, so the development costs for applications consistent with different output power levels and/or different energy storing capacities will be small.

The electric energy storage of the invention and the associated switching arrangements and other circuit components required is presented in FIG. 1.

In the circuit diagram in FIG. 1, a supercapacitor pack 19 giving a high voltage is connected to the power source of the motor 13 of an elevator system. The supercapacitor pack 19 consists of a combination of a plurality of supercapacitors, wherein the capacitors are typically connected in series. According to an example of the present invention, the voltage obtained from the terminals of the supercapacitor is 700 V. Accordingly, a storage capacity value, i.e. capacitance value of the supercapacitor even as high as ten farads is obtained, whereas e.g. the capacitors typically used in ordinary circuit applications have a maximum capacitance of the order of a few millifarads. The supercapacitor pack stores electric energy so that the energy stored during low power consumption can be used when the motor needs more electric energy. This leads to a reduction of costs as a result of the energy saving.

In the circuit diagram, a three-phase alternating current is applied as an input to a rectifier 10. The rectified signal is connected to a so-called DC capacitor 11, which is charged immediately upon being connected to the power supply via the rectifier 10. The elevator is able to work normally even if the supercapacitor pack 19 has no charge. The DC portion of the circuit, contained in the energy storage 19, is passed to an inverter 12, which produces at its output the required alternating current for the motor 13 controlling the movement of the elevators. In the example according to the invention, the output power provided by the inverter is between ten and a hundred kilowatts.

The supercapacitor pack 19 is connected to the rectified signal via three branches. Of these, the middle ranch according to FIG. 1 is a so-called pre-charging ranch, which comprises a pre-charging resistor 18 and a pre-charging switch 15. When the elevator is traveling during a few trips after start-up of the system, the supercapacitor pack 19 is charged while the pre-charging switch 15 is closed. In practice, the charging occurs when the elevator is stationary. Also, trips made by the car with a light load requiring a low motor power allow the capacitor pack 19 to be pre-charged via the pre-charging branch. The desired time required for the charging determines the costs caused by the resistance 18. In an example of the invention, the size of the resistance is 100 Ω.

Once the supercapacitor 19 has been charged so that the voltage at its terminals is the same as in the DC capacitor 11, the pre-charging switch 15 is opened and the charging switch 14 closed. The charging switch 14 is placed in a so-called charging branch, which also comprises a diode 17 in series with the switch 14. The diode 17 permits a current flow only in the direction that allows charging of the capacitor pack. No discharging is allowed through the charging branch diode 17. When the charging branch is closed, the voltage of the supercapacitor pack 19 rises to a level exceeding the voltage of the DC capacitor 11, because energy obtained during braking can be stored into the capacitor pack 19 serving as an energy storage. Since the voltage across the capacitor pack 19 is higher than the DC voltage, the energy of the supercapacitor pack 19 can be connected to feed the motor 13, thereby reducing the current drawn from the mains supply via the rectifier 10. This connection is made by closing the discharging branch switch 16 while the other switches are open. When the voltage of the supercapacitor pack 19 has fallen to the level of the nominal voltage of the DC capacitor, the discharging branch is disconnected by opening the discharging switch 16.

The pre-charging branch can be closed at any time by means of the pre-charging switch 15, in this way charging the DC capacitor 11 with the energy of the capacitor pack 19. This prevents the harmful power surge that would occur in the discharging switch 16 in consequence of a voltage difference between the capacitors at the instant when the switch 16 is closed.

The energy stored during low power consumption into the capacitor pack 19 can be used during subsequent elevator trips if there is a need for a large supply power e.g. due to a large passenger load. As compared to a system without an energy storage according to the invention, the energy saving resulting from the use of a capacitor pack 19 is about 50 percent.

In the above-described normal operational situation containing the invention, about 40 percent of the energy capacity of the supercapacitor pack 19 can be utilized and the voltage of the capacitor pack 19 varies between 550 Volt and 700 Volts.

Another operational condition of elevators as regards the use of the invention is emergency operation. This means a situation where for some reason the mains supply fails, which, if no backup system were provided, would cause the elevators to stop in their tracks, e.g. between floors. In this situation, the electric energy storage of the invention can be used as a source of reserve power. In the emergency mode it is appropriate to run the elevator at a lower speed than in a normal operational state. From this it follows that the voltage of the capacitor pack 19 may fall to a level of 200-300 volts. Further, since the energy of a capacitor is proportional to the square of the voltage of the capacitor, approximately 80-90% of the energy of the charged capacitor pack 19 can be utilized in an emergency. The inverter 12 can guarantee a sufficient torque for the motor 13, provided that the DC voltage (at the input of the inverter 12) remains within the range of 200 . . . 700 V, even if, consistently with the emergency mode, only the capacitor pack 19 is connected to the inverter input while switch 16 closed.

The control logic controlling the movement of the elevators also contains emergency mode control. In practice, emergency control is connected to switch 16, which can be closed and opened as required. In addition to what was said above, the inverter 12 also functions as a component controlling the magnitude of the voltage. In this way, the motor is always fed with an input voltage of correct magnitude and furthermore the desired motor torque for the elevators is obtained. In the emergency mode function it is also important that the number of components needed in an emergency is as small as possible. In this way, operation in an emergency is also guaranteed and the risk of complete interruption of the operation of the elevator system is reduced.

The switches 14, 15, 16 may be electromechanical or semiconductor switches, or some of the switches may be electromechanical and some may be semiconductor switches. The switch used may also consist of a different type of element applicable.

The invention is not limited to the embodiment examples described above; instead, many variations are possible within the scope of the inventive concept defined in the claims.

The invention claimed is:

1. A method for storing electric energy needed in an elevator system and for supplying the elevator system with reserve power, comprising:
    placing a supercapacitor in the electricity supply circuit of the elevator motor;
    pre-charging the supercapacitor with electric energy after start-up of the system;
    charging the supercapacitor with electric energy during substantially low energy consumption of the elevator by closing a charging switch; and
    discharging electric energy from the supercapacitor to the motor during substantially high energy consumption of the elevator or in the case of a failure of the electric power supply by closing a discharging switch;

conducting the pre-charging current to the supercapacitor via a first switching branch consisting essentially of a series connection of a closed pre-charging switch and a resistor.

2. The method according to claim 1, further comprising: conducting a charging current to the supercapacitor via a second switching branch consisting essentially of a series connection of a charging switch and a diode.

3. The method according to claim 1, further comprising: conducting a discharging current via a third switching branch consisting essentially of a discharging switch from the supercapacitor to the motor.

4. The method according to claim 1, further comprising: charging the supercapacitor with electric energy when the elevator is stationary or traveling with a light load.

5. The method according to claim 1, further comprising: charging the supercapacitor with electric energy when the elevator is braking.

6. The method according to claim 1, further comprising: using the supercapacitor as an extra source of electric energy when the elevator is heavily loaded.

7. A method for storing electric energy needed in an elevator system and for supplying the elevator system with reserve power, comprising;
pre-charging the supercapacitor with electric energy, via a first switching branch, after start-up of the system;
charging the supercapacitor with electric energy, via a second switching branch, during substantially low energy consumption of the elevator by closing a charging switch; and
discharging electric energy from the supercapacitor, via a third switching branch, to the motor during substantially high energy consumption of the elevator or in the case of a failure of the electric power supply by closing a discharging switch;
conducting the alternating-current electric energy obtained as power supply into a rectifier;
connecting the first, second and third switching branches in parallel to the rectified power supply signal;
connecting the parallel connection of the switching branches in series with the supercapacitor;
conducting the rectified power supply signal into an inverter; and
conducting the inverted power supply signal to the motor.

8. The method according to claim 7, further comprising:
using the supercapacitor as a source of reserve power when the power supply fails;
conducting a supply voltage substantially lower than in a normal operating condition from the supercapacitor via the inverter to the motor; and
moving the elevator at a velocity supply lower than in a normal operating condition.

9. The method according to claim 7, further comprising: conducting a pre-charging current to the supercapacitor via the first switching branch consisting essentially of a series connection of a closed pre-charging switch and a resistor.

10. The method according to claim 7, further comprising: conducting a charging current to the supercapacitor via the second switching branch consisting essentially of a series connection of a charging switch and a diode.

11. The method according to claim 7, further comprising: charging the supercapacitor with electric energy when the elevator is stationary or traveling with a light load.

12. The method according to claim 7, further comprising: charging the supercapacitor with electric energy when the elevator is braking.

13. The method according to claim 7, further comprising: using the supercapacitor as an extra source of electric energy when the elevator is heavily loaded.

14. The method according to claim 7, further comprising: conducting a discharging current via the third switching branch consisting essentially of a discharging switch from the supercapacitor to the motor.

15. The method according to claim 7, further comprising: connecting a DC capacitor to the terminals of the output signal of the rectifier.

16. The method according to claim 15, further comprising:
pre-charging the supercapacitor by closing the pre-charging switch when the voltage of the supercapacitor is lower than the voltage of the DC capacitor;
opening the pre-charging switch when the voltage of the supercapacitor reaches the value of the voltage of the DC capacitor; and
charging the supercapacitor by closing the charging switch and opening the discharging switch.

17. A method according to claim 15, further comprising:
discharging electric energy from the supercapacitor to the motor by closing the discharging switch when the voltage of the supercapacitor is higher than the voltage of the DC capacitor and opening the pre-charging switch and the charging switch; and
opening the discharging switch when the voltage of the supercapacitor reaches the value of the voltage of the DC capacitor.

18. The method according to claim 15, further comprising:
charging the DC capacitor by closing the pre-charging switch when the voltage of the supercapacitor is higher than the voltage of the DC capacitor.

19. A system for storing energy needed in an elevator system and for supplying reserve power to the elevator system, comprising:
at least one elevator;
a motor driving said at least one elevator;
further comprising:
a supercapacitor placed in the electricity supply circuit of the elevator motor;
a pre-charging switch to allow the supercapacitor to be pre-charged with electric energy after start-up of the system;
a charging switch to allow the supercapacitor to be charged with electric energy during substantially low energy consumption by the elevator;
a discharging switch to allow electric energy to be discharged from the supercapacitor to the motor during substantially high energy consumption by the elevator or in the case of a failure of the power supply; and
a first switching branch consisting essentially of a series connection of a resistor and the pre-charging switch to allow pre-charging current to be conducted to the supercapacitor.

20. The system according to claim 19, further comprising:
a second switching branch consisting essentially of a series connection of the charging switch and a diode for conducting a charging current to the supercapacitor.

21. The system according to claim 19, further comprising:
a third switching branch consisting essentially of the discharging switch for conducting a discharging current from the supercapacitor to the motor.

22. The system according to claim 19, further comprising:
a supercapacitor for storing electric energy when the elevator is stationary or traveling with a light load.

23. The system according to claim 19, further comprising:
a supercapacitor for storing electric energy when the elevator is braking.

24. The system according to claim 19, further comprising:
a supercapacitor as an extra source of electric energy when the elevator is heavily loaded.

25. A system for storing energy needed in an elevator system and for supplying reserve power to the elevator system comprising:
at least one elevator;
a motor driving said at least one elevator;
a supercapacitor placed in the electricity supply circuit of the elevator motor;
a pre-charging switch to allow the supercapacitor to be pre-charged with electric energy after start-up of the system;
a charging switch to allow the supercapacitor to be charged with electric energy during substantially low energy consumption by the elevator; and
a discharging switch to allow electric energy to be discharged from the supercapacitor to the motor during substantially high energy consumption by the elevator or in the case of a failure of the power supply;
a first switching branch;
a second switching branch;
a third switching branch;
a rectifier for an alternating-current power supply;
a parallel connection of the first, second and third switching branches connected to the output of the rectifier;
a series connection of the parallel connection of the switching branches and the supercapacitor;
an inverter for the rectified power supply signal; and
the motor connected to the output of the inverter.

26. The system according to claim 25, further comprising:
a supercapacitor as a source of reserve power in the case of a failure of the power supply;
control means for conducting a supply voltage substantially lower than in a normal operational condition from the supercapacitor via the inverter to the motor; and
a motor for driving the elevator at a velocity substantially lower than in a normal operational condition.

27. The system according to claim 25, wherein the first switching branch consists essentially of a series connection of a resistor and said pre-charging switch to allow pre-charging current to be conducted to the supercapacitor.

28. The system according to claim 25, wherein the second switching branch consists essentially of a series connection of said charging switch and a diode for conducting a charging current to the supercapacitor.

29. The system according to claim 25, wherein the third switching branch consists essentially of said discharging switch for conducting a discharging current from the supercapacitor to the motor.

30. The system according to claim 25, further comprising:
a supercapacitor for storing electric energy when the elevator is stationary or traveling with a light load.

31. The system according to claim 25, further comprising:
a supercapacitor for storing electric energy when the elevator is braking.

32. The system according to claim 25, further comprising:
a supercapacitor as an extra source of electric energy when the elevator is heavily loaded.

33. The system according to claim 25, further comprising:
a DC capacitor connected to the terminals of the output signal of the rectifier.

34. The system according to claim 33, further comprising:
a pre-charging switch for pre-charging the supercapacitor when the voltage of the supercapacitor is lower than the voltage of the DC capacitor;
a controller of the pre-charging switch for opening the pre-charging switch when the voltage of the supercapacitor reaches the value of the voltage of the DC capacitor; and
a controller of the charging switch and a controller of the discharging switch for charging the supercapacitor by closing the charging switch and opening the discharging switch.

35. The system according to claim 33, further comprising:
a discharging switch for discharging electric energy from the supercapacitor to the motor when the voltage of the supercapacitor is higher than the voltage of the DC capacitor and the pre-charging switch and the charging switch are open; and
a controller of the discharging switch for opening the discharging switch when the voltage of the supercapacitor reaches the value of the voltage of the DC capacitor.

36. The system according to claim 33, further comprising:
a pre-charging switch for charging the DC capacitor when the voltage of the supercapacitor is higher than the voltage of the DC capacitor.

* * * * *

UNITED STATES PATENT AND TRADEMARK OFFICE
CERTIFICATE OF CORRECTION

PATENT NO. : 7,331,426 B2  
APPLICATION NO. : 11/645052  
DATED : February 19, 2008  
INVENTOR(S) : Pekka Jahkonen It is certified that error appears in the above-identified patent and that said Letters Patent is hereby corrected as shown below:

On the Title page at Item (30) "Dec. 7, 2004 (FI) ....................... 20040973" should read --Jul. 12, 2004 (FI) ......................... 20040973--

Signed and Sealed this

Fifteenth Day of July, 2008

JON W. DUDAS  
*Director of the United States Patent and Trademark Office*